United States Patent [19]
Shimoda et al.

[11] Patent Number: 5,147,832
[45] Date of Patent: Sep. 15, 1992

[54] THERMAL CONDUCTIVE COLORED ALUMINUM NITRIDE SINTERED BODY AND METHOD OF PREPARING THE SAME

[75] Inventors: Kouhei Shimoda; Takao Maeda; Kouichi Sogabe; Masaya Miyake, all of Hyogo, Japan

[73] Assignee: Sumitomo Electric Industries, Ltd., Osaka, Japan

[21] Appl. No.: 738,461

[22] Filed: Jul. 31, 1991

[30] Foreign Application Priority Data

Aug. 7, 1990 [JP] Japan .................. 2-210022

[51] Int. Cl.$^5$ .............................. C04B 35/58
[52] U.S. Cl. .......................... 501/96; 501/98
[58] Field of Search ...................... 501/96, 98

[56] References Cited

U.S. PATENT DOCUMENTS

| | | | |
|---|---|---|---|
| 4,478,785 | 10/1984 | Huseby et al. | 501/98 |
| 4,833,108 | 5/1989 | Mizuno et al. | 501/96 |
| 4,843,038 | 6/1989 | Kuratani et al. | 501/98 |
| 5,001,089 | 3/1991 | Kasori et al. | 501/96 |
| 5,034,357 | 7/1991 | Yamakawa | 501/96 |

FOREIGN PATENT DOCUMENTS 63-233072 9/1988 Japan .
63-310772 12/1988 Japan .

*Primary Examiner*—Wayne Langel
*Attorney, Agent, or Firm*—W. G. Fasse

[57] ABSTRACT

An AlN sintered body which has a color within the range of gray to black and a thermal conductivity within the range of 100 to 270 W/m·K at room temperature. Such a body is useful as an electronic material and a method of preparing the same. The AlN sintered body contains 100 parts by weight of AlN, 0.005 to 0.5 parts by weight of carbon, not more than 1 part by weight of a boron compound in terms of the simple substance of boron, 0.01 to 15 parts by weight of a rare earth aluminum oxide in terms of the simple substance of the rare earth element, and 0.01 to 15 parts by weight of a compound containing an element belonging to the group IVB of the periodic table in terms of the simple substance of the element. This AlN sintered body is obtained by shaping a mixture of the above components into a prescribed configuration and thereafter firing the as-formed compact in a non-oxidizing atmosphere containing at least 10 percent by volume of nitrogen, at a temperature of 1500° to 2100° C.

8 Claims, No Drawings

THERMAL CONDUCTIVE COLORED ALUMINUM NITRIDE SINTERED BODY AND METHOD OF PREPARING THE SAME

FIELD OF THE INVENTION

The present invention relates to a ceramic sintered body which is used as an electronic material such as an IC substrate material, a package material or the like. More particularly, the invention relates to an aluminum nitride sintered body which is colored and has a high thermal conductivity, and to a method of preparing the same.

BACKGROUND INFORMATION

In recent years, large-scale integrated circuit (LSI) techniques have been greatly developed with remarkable improvements in the degree of integration, in particular. Following such improvement of the degree of integration and due to an increase of the IC chip size, the heat value generated in a package carrying such an IC chip thereon, is increased. Thus, the heat radiation property of a substrate material used as a package for a semiconductor device or the like has become important. An alumina sintered body, which has been widely used as an IC substrate, cannot cope with such an increase of the generated heat value of the IC chip, since alumina has only a small thermal conductivity and hence heat radiation property of an alumina sintered body is insufficient. Beryllia has been studied as a substitute for such an alumina sintered body since Beryllia has a higher thermal conductivity than alumina. However, beryllia is hard to handle due to its toxicity.

On the other hand, a sintered body of aluminum nitride (AlN) has been considered with interest as a material for a circuit board or a package for a semiconductor device, since aluminum nitride has an essentially superior in thermal conductivity and insulation ability. Additionally AlN is not toxic.

In general, an impurity content of an AlN sintered body is so reduced that an AlN sintered body with excellent thermal conductivity and electrical insulation ability is obtained. Such a sintered body is preferably used as an optical filter or the like in practice, since the same has also an excellent transparency. When the AlN sintered body is used as a package or the like, however, the transmission of ultraviolet rays leads to malfunction of the IC, resulting in a significant problem.

In order to cope with this problem, colored AlN sintered bodies have been studied in various ways, and several successful cases have been reported.

For example, Japanese Patent Laying-Open Gazette No. 63-233079 (1988) discloses a black aluminum nitride sintered body and a method of preparing the same. According to this literature, a specific amount of calcium tungstate powder and/or calcium molybdate powder is added to and mixed with AlN powder, and the mixture is molded and then fired in a non-oxidizing atmosphere, to obtain a black AlN sintered body.

On the other hand, Japanese Patent Laying-Open Gazette No. 63-310772 (1988) discloses a black AlN sintered body which is obtained by sintering AlN powder with an additive of metal molybdenum or a molybdenum compound. However, the aluminum nitride sintered bodies disclosed in the aforementioned gazettes have only low thermal conductivities of about 100 W/m·K.

Since AlN easily incorporates an impurity such as oxygen, high-purity AlN powder is generally employed in order to improve the thermal conductivity of an AlN sintered body. If any one of the aforementioned materials is added to AlN in order to color the AlN sintered body, its thermal conductivity is reduced. Thus, it is impossible to obtain a colored AlN sintered body which also has a high thermal conductivity.

A high thermal conductivity is required for a substrate material for carrying an IC chip having a high output, for improving the heat radiation property, in order to prevent the a malfunction of the IC due to a temperature rise of the IC chip. At the same time, the substrate must be colored in order to prevent the an IC malfunction due to transmission of ultraviolet rays. According to the prior art, however, it has been difficult to provide a ceramic substrate which can satisfy the two requirements for the substrate material for an IC chip, as hereinabove described.

SUMMARY OF THE INVENTION

Accordingly, an it is object of the present invention to provide a colored aluminum nitride sintered body having an excellent thermal conductivity, which is useful as an electronic material such as an IC package material or a substrate material. Another object is to provide a method of preparing an AlN sintered body.

In consideration of the aforementioned circumstances, the inventors have studied AlN sintered bodies in an effort to provide such bodies with two incompatible characteristics namely a high thermal conductivity and a coloring. Our studies yielded the following three points:

(a) The presence of carbon is effective for coloring the sintered body.

(b) If specific composition amounts of carbon, boron oxide, an oxide of a rare earth element and a compound of an element belonging to the group IVB, VB or VIB of the periodic table, are added to AlN and fired, the as-formed AlN sintered body exhibits a high thermal conductivity of at least 100 W/m·K and not more than 270 W/m·K at room temperature. Simultaneously, the sintered body is colored. Such coloring is gray, dark gray, or black as disclosed below.

(c) When prescribed composition amounts of a rare earth aluminum oxide, which is a composite oxide of a rare earth oxide and aluminum oxide, and a compound of an element belonging to the group IVB, VB or VIB of the periodic table as well as a specific amount of carbon are contained, in the mixture the as-formed AlN sintered body has a high thermal conductivity of at least 100 W/m·K and not more than 270 W/m·K at room temperature. Simultaneously, the sintered body is colored as mentioned.

In a specific composition according to the present invention, the aluminum nitride sintered body contains 100 parts by weight of AlN, at least 0.005 parts by weight and not more than 0.5 parts by weight of carbon, not more than 1 part by weight of a boron compound in terms of the simple substance of boron, at least 0.01 parts by weight and not more than 15 parts by weight of a rare earth aluminum oxide in terms of the simple substance of the rare earth element, and at least 0.01 parts by weight and not more than 15 parts by weight of at least one compound selected from a group of compounds containing elements belonging to the groups IVB, VB and VIB of the periodic table in terms of the simple substance of the element contained in the compound. The elements belonging to the group VIB of the periodic table, are Ti, Zr and Hf. The elements of group VB, are V, Nb and Ta. The elements of group VIB, are Cr, Mo and W.

The rare earth elements are Sc, Y, La, Ce, Pr, Nd, Sm, Eu, Gd, Tb, Dy, Ho, Er, Yb and Lu. The rare earth aluminum oxide is formed by a chemical reaction between the added rare earth element oxide and aluminum oxide which is contained in the AlN as an impurity which is present in the sintered body. While the effect of the existence of the rare earth aluminum oxide is not varied with the type of the rare earth element, Sc, Y, La or Ce is preferably used in order to obtain a reliable sintered body which has an excellent chemical resistance and the like.

The carbon content in the aluminum nitride sintered body is restricted within a range of at least 0.005 parts by weight and not more than 0.5 parts by weight with respect to 100 parts by weight of aluminum nitride. If the carbon content is smaller than the lower limit of this range, it is impossible to obtain a sintered body which has a high thermal conductivity. If the carbon content exceeds the upper limit of the aforementioned range, on the other hand, carbon reduces the liquid phase of the rare earth aluminum oxide during firing thereby inhibiting a mass transfer through the liquid phase. Hence, it is impossible to obtain a dense sintered body.

Further, it has been found to be possible to obtain an AlN sintered body which is colored and also has excellent thermal conductivity, by bringing AlN crystal grains contained in the AlN sintered body, into a sufficiently coarse states and by finely dispersing in the mixture particles of a compound of an element belonging to the group IVB, VB or VIB of the periodic table. This effect is remarkable when the AlN crystal grains are at least 1.0 $\mu$m in mean particle diameter. A further remarkable effect is attained when the AlN crystal grains are within a range of 2 to 15 $\mu$m in mean particle diameter. If the mean particle diameter of the AlN crystal grains exceeds 15 $\mu$m, the thermal conductivity is not much improved and the sintered body is not sufficiently colored. If the ratio of the mean particle diameter of the AlN crystal grains to that of the particles of the compound of the element belonging to the group IVB, VB or VIB of the periodic table (AlN particles/-particles of the compound of the element belonging to the group IVB, VB or VIB of the periodic table) is small, the as-formed AlN sintered body has an inferior thermal conductivity and is insufficiently colored. Thus, said ratio is preferably at least 2.0.

In a method of preparing a thermal conductive colored aluminum nitride sintered body according to one aspect of the present invention, at least 0.01 parts by weight and not more than 5 parts by weight of carbon, not more than 1 part by weight of boron oxide in terms of the simple substance of boron, at least 0.01 parts by weight and not more than 15 parts by weight of an oxide of a rare earth element in terms of the simple substance of the rare earth element, and at least 0.01 parts by weight and not more than 15 parts by weight of at least one compound selected from a group of oxides, carbides and nitrides of elements belonging to the groups IVB, VB and VIB of the periodic table in terms of the simple substance of the element contained therein, are added to 100 parts by weight of aluminum nitride, to obtain a mixture. This mixture is shaped into a prescribed configuration, to obtain a compact. This compact is fired in a non-oxidizing atmosphere containing at least 10 percent by volume of nitrogen under a temperature of at least 1500° C. and not more than 2100° C.

The amount of carbon is synthetically determined while taking into account the type of the added carbon, the oxygen content in the AlN raw material powder the, firing conditions, and the like. At least 0.01 parts by weight and not more than 5 parts by weight of carbon is added to 100 parts by weight of aluminum nitride, for a reason similar to the above. The lower limit of the amount of carbon, is set at 0.01 parts by weight, so that the finally obtained aluminum nitride sintered body contains at least 0.005 parts by weight of carbon.

The carbon material may be prepared of carbon black, coke, graphite powder, diamond powder or the like. Such a carbon material is preferably restricted to a specific grain size, a specific surface area, a specific pH value, a specific volatile constituent and the like, so that the same is homogeneously dispersed in an unsintered body of aluminum nitride. In particular, it is effective to employ pulverized carbon black, which has a BET value of at least 200 m$^2$/g. The term "BET value" indicates one value of a specific surface area measured by an absorption process.

The firing temperature is set to be at least 1500° C. since the speed of densification of the sintered body is lowered if the temperature is less than 1500° C. resulting in a less valuable product. If the firing temperature exceeds 2100° C., on the other hand, it is difficult to obtain a dense sintered body since aluminum nitride is remarkably decomposed and evaporated. The rare earth aluminum oxide is formed by reaction between the rare earth element oxide and the aluminum oxide. Grain growth of AlN progresses due to mass transfer through the liquid phase of the rare earth aluminum oxide. If a temperature for forming such a liquid phase, i.e., the melting point of the rare earth aluminum oxide, is in excess of 2100° C., it is difficult to obtain a dense sintered body due to the decomposition and/or evaporation of the AlN.

The thermal conductivity of the colored aluminum sintered body is improved by the addition of carbon conceivably in the following mechanism: If a compound of an element belonging to the group IVB, VB or VIB of the periodic table, is added to an unsintered body and fired in the conventional method, the liquid phase of the rare earth aluminum oxide has an inferior wettability with respect to the aluminum nitride particles. Further, the compound of the element belonging to the group IVB, VB or VIB of the periodic table, which has an inferior wettability with respect to the AlN particles, remains in grain boundary portions of the sintered body, thereby contribute to the coloring of the sintered body. At the same time, the compound is partially dissolved in the AlN particles with oxygen. If the compound is thus partially dissolved in the AlN particles with oxygen, and the AlN particles are inferior in wettability with respect to the liquid phase of the rare earth aluminum oxide, it is difficult to trap oxygen from the AlN particles into the liquid phase of the rare earth aluminum oxide. It is known that untrapped oxygen is dissolved in the particles of the AlN sintered body whereby an oxynitride of Al ($Al_{(8/3+x/3)}O_{4-x}N_x$), spinel ($Al_9O_3N_7$), $\alpha$-$Al_2O_3$ and the like is formed to significantly reduce the thermal conductivity of the sintered body, even if the sintered body is dense.

On the other hand, the inventors have found that carbon has reduces oxygen which is dissolved in the AlN particles following partial dissolution of the compound of the element belonging to the group IVB, VB or VIB of the periodic table and removing oxygen from the system. It is amazing that the wetting ability of the liquid phase is not deteriorated with respect to the AlN particles in which the compound of the element belonging to the group IVB, VB or VIB of the periodic table is dissolved but oxygen is sufficiently trapped, whereby it is possible to obtain a sintered body having a high thermal conductivity. Further, carbon contained in the sintered body scatters visible light which is transmitted through the sintered body, to effectively color the sintered body. It is possible to obtain a sintered body which is colored and has a high thermal conductivity because the effect of such coloring is not lost by the addition of the compound of the element belonging to the group IVB, VB or VIB of the periodic table.

The present aluminum nitride sintered body is colored by the addition of boron oxide in the following mechanism: The added boron oxide partially reacts with the added compound of an element belonging to the group IVB, VB or VIB of the periodic table, to form a boride or a boron oxide of the element belonging to the group IVB, VB or VIB of the periodic table. Such a boride or boroxide of the element belonging to the group IVB, VB or VIB of the periodic table has a small band gap, and causes light absorption in a visible region. Thus, it is believed that the as-formed sintered body is colored due to the presence of such a substance in the AlN sintered body.

The boron oxide material may be prepared from a compound such as boric acid or ester of boric acid such as triethoxyboron, for example, which forms boron oxide by firing, hydrolysis or the like, in place of an oxide. The effect does not change with the type of the compound. The coloring effect for the AlN sintered body is improved as the particle diameter of the compound is reduced. In particular, a compound having a particle diameter of about 0.05 to 1 μm is preferably employed.

The amount of boron oxide is not more than 1 part by weight in terms of the simple substance of boron since boron oxide remarkably volatilizes during firing to inhibit densification of the sintered body and reduce the thermal conductivity if the amount exceeds 1 part by weight.

The compound of an element belonging to the group IVB, VB or VIB of the periodic table may be prepared from a compound which forms an oxide, a carbide or a nitride by firing, such as an inorganic compound of an element belonging to the group IVB, VB or VIB of the periodic table such as a nitrate or an oxalate. Instead of an oxide forming compound, an organic metal compound such as an alkoxide, for example, may be used e.g., a carbide or a nitride, to attain a similar effect. The coloring effect is improved as the particle diameter of the compound is reduced. In particular, a compound having a particle diameter of about 0.05 to 1 μm is preferably employed. This compound can be used with no problem if the particle diameter thereof is about 20 times that of the AlN powder.

In a method of preparing a thermal conductive colored aluminum nitride sintered body according to another aspect of the present invention, a mixture is prepared of at least 0.01 parts by weight and not more than 5 parts by weight of a compound for liberating carbon in terms of the amount of free carbon, not more than 1 part by weight of boron oxide in terms of the simple substance of boron, at least 0.01 parts by weight and not more than 15 parts by weight of an oxide of a rare earth element in terms of the simple substance of the rare earth element, and at least 0.01 parts by weight and not more than 15 parts by weight of at least one compound selected from oxides, carbides and nitrides of elements belonging to the groups IVB, VB or VIB of the periodic table in terms of the simple substance of the element are added to 100 parts by weight of aluminum nitride, to obtain a mixture. This mixture is shaped into a prescribed configuration, to obtain a compact. The compact is heated in a non-oxidizing atmosphere at a temperature of at least 150° C. and not more than 1500° C., to liberate carbon. Thereafter the compact is fired in a non-oxidizing atmosphere containing at least 10 percent by volume of nitrogen at a temperature of at least 1500° C. and not more than 2100° C.

The compound liberating carbon may be prepared from an organic compound such as a fatty acid compound or an aromatic compound, or a high molecular compound such as styrene resin, acrylic resin, phenol resin or urethane resin. According to the present invention, it is preferable to employ a member of the group of polyacrylonitrile, polyvinyl alcohol, polyvinyl butyral, polyethylene terephthalate, glucose, fructose and sucrose, or a mixture thereof.

While carbon is contained in an unsintered body in the aforementioned method according to the first aspect of the present invention, a compound liberating carbon is contained in an unsintered body in the method according to the second aspect of the present invention. According to this method, it is possible to homogenize the distribution of carbon in the as-formed sintered body and to improve the uniformity of the composition, the color tone etc. of the sintered body by appropriately selecting the compound for liberating carbon to be homogeneously dispersed in the unsintered body.

In a method of preparing a thermal conductive colored aluminum nitride sintered body according to still another aspect of the present invention, a mixture is prepared containing not more than 1 part by weight of boron oxide in terms of the simple substance of boron, at least 0.01 parts by weight and not more than 15 parts by weight of an oxide of a rare earth element in terms of the simple substance of the rare earth element, and at least 0.01 parts by weight and not more than 15 parts by weight of at least one compound selected from a group of oxides, carbides and nitrides of elements belonging to the groups IVB, VB and VIB of the periodic table in terms of the simple substance of the element are added to 100 parts by weight of aluminum nitride. This mixture is shaped into a prescribed configuration, to obtain a compact which is fired in a non-oxidizing atmosphere containing at least 10 percent by volume and not more than 90 percent by volume of hydrocarbon gas and at least 10 percent by volume of nitrogen under a temperature of at least 1500° C. and not more than 2100° C.

The hydrocarbon gas is introduced in order to remove oxygen from the system by chemical reaction. While such an effect is reliably attained so far as the hydrocarbon gas is prepared from a reducing gas containing carbon, it is preferable to employ methane gas, ethylene gas, acetylene gas, propane gas or butane gas, according to the present invention.

In the aforementioned method according to the first or second aspect of the present invention, the mixture is shaped into a compact and carbon or a compound liberating carbon is added to the compact, in order to remove oxygen, which follows partial dissolution of the compound of the element belonging to the group IVB, VB or VIB of the periodic table in the AlN particles, from the system by solid phase reaction with carbon. On the other hand, the method according to the third aspect of the present invention is characterized in that oxygen, which follows a partial dissolution of the compound of the element belonging to the group IVB, VB or VIB of the periodic table in the AlN particles, is removed from the system by vapor phase reaction with the hydrocarbon gas. Such hydrocarbon gas has a higher reactivity as compared with carbon or that liberated from the compound, and efficiently reduces oxygen which follows partial dissolution of the compound of the element belonging to the group IVB, VB or VIB of the periodic table in the AlN particles within a short period, to remove the oxygen from the system. Thus, it is possible to obtain a colored aluminum nitride sintered body having a high thermal conductivity also when a relatively short firing pattern is employed. Further, while the composition, the color tone and the like of the sintered body according to the first or second aspect of the present invention may not be uniform depending on the dispersed state of carbon or the compound liberating carbon in the method, such non-uniformity is hardly caused in the method according to the third aspect of the present invention.

At least 0.01 parts by weight and not more than 15 parts by weight of the rare earth element oxide is added in terms of the simple substance of the rare earth element so that the as-formed aluminum nitride sintered body contains the rare earth aluminum oxide within the same range in terms of the simple substance of the rare earth element, for the following reason: If the amount of the rare earth element oxide is smaller than the lower limit of this range, the absolute amount of the liquid phase of the rare earth aluminum oxide, which is a composite oxide, is so insufficient that a dense sintered body cannot be obtained. However, if the amount exceeds the upper limit of the above range, an excess liquid phase exudes out on the surface of the sintered body, to destabilize the color tone of the as-formed sintered body with spots and the like.

At least 0.01 parts by weight and not more than 15 parts by weight of at least one compound selected from oxides, carbides and nitrides of elements belonging to the groups IVB, VB and VIB of the periodic table is added in terms of the simple substance of the rare earth element so that the as-formed aluminum nitride sintered body contains the compound containing the element within the same range for the following reason. If the amount of the compound is smaller than the lower limit of this range, the as-formed sintered body is insufficiently colored. However, if the amount exceeds the upper limit of the above range, the compound of the element is dissolved in the liquid phase of the rare earth aluminum, oxide, which is a composite oxide, to extremely inhibit the wetting ability with respect to the AlN particles, and hence a dense sintered body cannot be obtained.

The effect according to the present invention can be sufficiently attained by adding only the aforementioned components to aluminum nitride, while it is also possible to employ a well-known binder such as acrylic resin, for example PVA, PVB or PMMA, paraffin or the like, in order to improve the unsintered body's ability to be compacted. Further, 50 parts by weight of hexagonal BN may be contained in 100 parts by weight of AlN at the maximum, in order to improve characteristics such as the mechanical workability.

In the present method of preparing an aluminum nitride sintered body, the step of shaping the mixture having a prescribed composition, may be carried out by any method such as a doctor blade coater, press molding, CIP (cold isostatic pressing) or the like.

The thermal conductive colored aluminum nitride sintered body obtained in the aforementioned manner simultaneously satisfies the two requirements of obtaining simultaneously the required thermal conductivity and the coloring, which the prior art considered to be incompatible with each other. When an IC chip is carried on a substrate of the present aluminum nitride sintered body, it is possible to suppress a temperature rise caused by heat generated by the IC chip and simultaneously prevent the transmission of ultraviolet rays from the exterior through the sintered body. Consequently, it is possible according to the invention to prevent malfunctions of the IC chip. The substrate may be in the form of a widely known substrate such as DIP (dual-in-line package), LCC (leadless chip carrier), a flat package, PGA (pin grid array), a cerquad package, a hybrid package, a mother board, or the like. The characteristics of the substrate, i.e. a high thermal conductivity and coloring, are not diminished by the form of the substrate. When the present aluminum nitride sintered body is applied to a substrate material in the aforementioned form, it generally comprises a conductor layer which is formed of tungsten or the like, a sealing layer which is formed of glass or the like, or a thin film circuit. The effect of such a conductor layer, sealing layer or thin film circuit is not damaged in a substrate which is made of the present aluminum nitride sintered body.

DESCRIPTION OF THE PREFERRED EMBODIMENTS

EXAMPLE 1

A mixture is prepared of: 1 part by weight of carbon black having a BET value of 500 $m^2/g$, 0.5 parts by weight of $B_2O_3$ in terms of the simple substance of boron, 1 part by weight of yttrium oxide in terms of the simple substance of yttrium, and 1 part by weight of titanium oxide in terms of the simple substance of titanium were added to 100 parts by weight of AlN powder having a mean particle diameter of 1 $\mu m$. A binder, a plasticizer, a deflocculant, a solvent, a wetting agent and an antistatic agent were added to this powder, and mixed with each other in a ball mill. The plasticizer was prepared from a mixture of dibutyl phthalate (D.B.P.) and benzyl butyl phthalate (B.B.P.). The deflocculant was prepared from menhaden fish oil. The solvent was prepared from a mixture of trichloroethylene, ethyl alcohol and methyl ethyl ketone. The wetting agent was prepared from monooleic acid glycerin. The as-formed slurry was defoamed, to prepare a green sheet of AlN by a doctor blade coater.

This green sheet was fired in a nitrogen atmosphere at a temperature of 1800° C. for 3 hours, to obtain a black sintered body.

The thermal conductivity of this sintered body was measured at room temperature, by a laser flash method. The result was 155 W/m·K.

This sintered body contained 0.03 parts by weight of carbon, 0.36 parts by weight of boron, 0.89 parts by weight of yttrium and 0.83 parts by weight of titanium with respect to 100 parts by weight of AlN respectively. The as-formed sintered body is listed as a sample No. 1 in Tables 1 and 2.

Components were similarly blended in accordance with compositions shown in Table 1 to prepare compacts by a doctor blade coater, and these compacts were fired at temperatures within a range of 1500° to 2100° C. Table 2 shows color tones and thermal conductivities of the as-formed sintered bodies, as well as the carbon contents, boron contents, yttrium contents, and the contents of elements belonging to the groups IVB, VB and VIB of the periodic table (additive contents) in the sintered bodies.

In order to measure mean particle diameters of AlN crystal grains and Ti compound particles contained in the AlN sintered bodies, fracture surfaces of the AlN sintered bodies were observed with a scanning electron microscope. The results were 5.4 μm and 0.3 μm, and the ratio (AlN particles/Ti compound particles) was 18.

Comparative Example 1

Components were blended in accordance with compositions shown in Table 3, to prepare compacts by the doctor blade coater in a manner similar to the above. The compacts were then fired at temperatures within a range of 1500° to 2100° C.

Table 4 shows color tones and thermal conductivities of the as-formed comparative sintered bodies, as well as carbon contents, boron contents, yttrium contents and contents of elements belonging to the groups IVB, VB and VIB of the periodic table (additive contents) in the sintered bodies.

EXAMPLE 2

A prescribed amount of polyvinyl alcohol serving as a compound liberating carbon, 0.5 parts by weight of $B_2O_3$ in terms of the simple substance of boron, 1 part by weight of yttrium oxide in terms of the simple substance of yttrium and 1 part by weight of titanium oxide in terms of the simple substance of titanium were added to 100 parts by weight of AlN powder having a mean particle diameter of 1 μm to form a mixture. A binder, a plasticizer, a solvent and a wetting agent were mixed into this powder mixture in a ball mill. The binder was prepared from a mixture of ethylene vinyl acetate (EVA) and polypropylene (PP). The plasticizer was prepared from a mixture of dibutyl phthalate (D.B.P.) and benzyl butyl phthalate (B.B.P.). The solvent was butyl alcohol. The as-formed slurry was granulated by spray drying, and press-molded under a pressure of 1 ton/cm².

The as-formed compact was heat treated in a nitrogen atmosphere under a temperature of 1000° C. for 2 hours, to liberate carbon. The amount of free carbon was 0.86 parts by weight with respect to 100 parts by weight of AlN. Thereafter the compact was fired in a nitrogen atmosphere at a temperature of 2000° C. for 5 hours, to obtain a black sintered body.

Through a measurement similar to Example 1, this sintered body exhibited a thermal conductivity of 160 W/m·K at room temperature. Further, the sintered body contained 0.03 parts by weight of carbon, 0.43 parts by weight of boron, 0.87 parts by weight of yttrium and 0.86 parts by weight of titanium with respect to 100 parts by weight of AlN respectively. This aluminum nitride sintered body is listed as a sample No.35 in Tables 5, 6 and 7.

Components were similarly blended in accordance with the compositions shown in Table 5, to prepare compacts by press molding. The compacts were heat treated under conditions shown in Table 6, to liberate carbon. Table 6 shows carbon contents with respect to 100 parts by weight of AlN, which were measured after the heat treatment. The heat treated compacts were fired at temperatures within a range of 1500° to 2100° C.

Table 7 shows color tones and thermal conductivities of the as-formed sintered bodies, as well as carbon contents, boron contents, yttrium contents and contents of elements belonging to the groups IVB, VB and VIB of the periodic table (additive contents) in the sintered bodies.

Example 3

1 part by weight of yttrium oxide in terms of the simple substance of yttrium and 1 part by weight of titanium oxide in terms of the simple substance of titanium were added to 100 parts by weight of AlN powder having a mean particle diameter of 1 μm. A deflocculant of octadiene was added to this powder, and mixed therewith in methyl isobutyl ketone in a ball mill. The as-formed slurry was dried at a temperature of 230° C., and a compact was prepared by a CIP method. This compact was fired in a non-oxidizing atmosphere containing 30 percent by volume of butane gas and a rest of ammonia gas, at a temperature of 1800° C. for 1 hour. Thus, a black sintered body was obtained.

The thermal conductivity of the as-formed sintered body was measured at room temperature in a similar manner to Example 1. The result was 155 W/m·K. Further, this sintered body contained 0.02 parts by weight of carbon, 0.36 parts by weight of boron, 0.83 parts by weight of yttrium and 0.87 parts by weight of titanium with respect to 100 parts by weight of AlN respectively. This aluminum sintered body is listed as a sample No. 59 in Tables 8,9 and 10.

Components were similarly blended in accordance with compositions shown in Table 8, to prepare compacts by the CIP method. The compacts were fired in a non-oxidizing atmospheres having compositions shown in Table 9, at temperatures within a range of 1500° to 2100° C. Table 10 shows color tones and thermal conductivities of the as-formed sintered bodies, as well as carbon contents, boron contents, yttrium contents and contents of elements belonging to the groups IVB, VB and VIB of the periodic table (additive contents) in the sintered bodies.

Example 4

A mixture was formed of 20 parts by weight of hexagonal BN, 1 part by weight of carbon black having a BET value of 250 m²/g, 1 part by weight of scandium oxide in terms of scandium, and 1 part by weight of titanium oxide in terms of the simple substance of titanium were added to 100 parts by weight of AlN powder having a mean particle diameter of 1 μm. A binder, a plasticizer, a solvent, and a wetting agent were added to the powder and mixed with each other in a ball mill. The binder was prepared from a mixture of ethylene vinyl acetate (EVA) and polypropylene (PP). The plasticizer was prepared from a mixture of dibutyl phthalate (D.B.P.) and benzyl butyl phthalate (B.B.P.). The solvent was butyl alcohol. The as-formed slurry was granulated by spray drying, and press-molded under a pressure of 1 ton/cm². The as-formed compact was fired in a nitrogen atmosphere at a temperature of 1900° C. for 2 hours. Thus, a black sintered body was obtained.

The thermal conductivity of the sintered body was measured at room temperature, similarly to Example 1. The result was 130 W/m·K. Further, this sintered body contained 0.03 parts by weight of carbon, 0.38 parts by weight of boron, 0.83 parts by weight of scandium and 0.82 parts by weight of titanium with respect to 100 parts by weight of AlN, respectively. This aluminum nitride sintered body is listed as a sample No. 86 in Tables 11 and 12.

Titanium oxide having rutile type crystals was employed as a compound containing an element belonging to the group IVB, VB or VIB of the periodic table, and blended with components in accordance with compositions shown in Table 1, to prepare compacts by press molding. The compacts were fired at temperatures within a range of 1500° to 2100° C.

Table 12 shows color tones and thermal conductivities of the as-formed sintered bodies, as well as carbon contents, boron contents, rare earth element contents and titanium contents in the sintered bodies.

Example 5

Tungsten oxide was employed as a compound containing an element belonging to the group IVB, VB or VIB of the periodic table and blended with components in accordance with compositions shown in Table 13, to prepare compacts by a doctor blade coater, similarly to Example 1. The compacts were fired at temperatures within a range of 1500° to 2100° C.

Table 14 shows color tones and thermal conductivities of the as-formed sintered bodies, as well as carbon contents, boron contents, rare earth element contents and tungsten contents in the sintered bodies.

Comparative Example 2

Tungsten oxide was employed as a compound containing an element belonging to the group IVB, VB or VIB of the periodic table and blended with components in accordance with compositions shown in Table 15, to prepare compacts by the doctor blade coater, similarly to Example 1. The compacts were fired at temperatures within a range of 1500° to 2100° C.

Table 16 shows color tones and thermal conductivities of the as-formed sintered bodies, as well as carbon contents, boron contents, rare earth element contents and tungsten contents in the sintered bodies.

Comparing the thermal conductivities and color tones of the samples obtained in accordance with the aforementioned Examples and Comparative Examples, the samples of the invention exhibit thermal conductivities of at least 100 W/m·K with gray or black colors. On the other hand, the comparative samples colored in black exhibited thermal conductivities of less than 100 W/m·K, while those showing thermal conductivities exceeding 100 W/m·K exhibited only white or spotted colors.

TABLE 1

| Example | Amount of Carbon (wt. part) | Amount of Boron (wt. part) | Amount of Yttrium (wt. part) | Amount of Additive (wt. part) | Added Compound |
|---|---|---|---|---|---|
| 1 | 1.00 | 0.50 | 1.00 | 1.00 | TiO$_2$ |
| 2 | 0.01 | 0.50 | 1.00 | 1.00 | TiO$_2$ |
| 3 | 0.50 | 0.50 | 0.01 | 1.00 | ZrO$_2$ |
| 4 | 1.00 | 0.50 | 1.00 | 0.01 | ZrO$_2$ |
| 5 | 3.00 | 0.50 | 1.00 | 1.00 | HfO$_2$ |
| 6 | 5.00 | 0.50 | 1.00 | 1.00 | V$_2$O$_5$ |
| 7 | 1.00 | 0.50 | 3.00 | 1.00 | Nb$_2$O$_5$ |
| 8 | 1.00 | 0.50 | 5.00 | 1.00 | Ta$_2$O$_5$ |
| 9 | 1.00 | 0.50 | 10.00 | 1.00 | Cr$_2$O$_3$ |
| 10 | 1.00 | 0.50 | 15.00 | 1.00 | CrO$_3$ |
| 11 | 1.00 | 0.50 | 1.00 | 3.00 | MoO$_3$ |
| 12 | 1.00 | 0.50 | 1.00 | 5.00 | WO$_3$ |
| 13 | 1.00 | 0.50 | 1.00 | 10.00 | WO$_3$ |
| 14 | 1.00 | 0.50 | 1.00 | 15.00 | WO$_3$ |
| 15 | 3.00 | 0.50 | 3.00 | 3.00 | TiN |
| 16 | 3.00 | 0.50 | 7.50 | 3.00 | TiC |
| 17 | 3.00 | 0.50 | 3.00 | 7.50 | ZrO$_2$ |
| 18 | 1.00 | 0.50 | 5.00 | 10.00 | TiO$_2$ |
| 19 | 5.00 | 0.50 | 1.00 | 10.00 | TiO$_2$ |
| 20 | 1.00 | 0.50 | 10.00 | 5.00 | TiO$_2$ |
| 21 | 0.50 | 0.50 | 0.50 | 0.50 | WO$_3$ |
| 22 | 1.00 | 0.50 | 050 | 0.50 | WO$_3$ |
| 23 | 0.50 | 0.50 | 1.00 | 0.50 | WO$_3$ |
| 24 | 0.50 | 0.50 | 0.50 | 1.00 | WO$_3$ |
| 25 | 1.00 | 0.01 | 1.00 | 1.00 | TiO$_2$ |
| 26 | 1.00 | 0.10 | 1.00 | 1.00 | TiO$_2$ |
| 27 | 1.00 | 1.00 | 1.00 | 1.00 | TiO$_2$ |

TABLE 2

| Example | Color Tone | Thermal Conductivity W/m K | Carbon Content (wt. part) | Boron Content (wt. part) | Yttrium Content (wt. part) | Additive Content (wt. part) |
|---|---|---|---|---|---|---|
| 1 | Black | 155 | 0.03 | 0.36 | 0.89 | 0.83 |
| 2 | Black | 120 | 0.005 | 0.33 | 0.85 | 0.92 |
| 3 | Black | 105 | 0.008 | 0.36 | 0.01 | 0.85 |
| 4 | Dark Gray | 175 | 0.04 | 0.38 | 0.82 | 0.01 |
| 5 | Black | 230 | 0.11 | 0.33 | 0.93 | 0.90 |
| 6 | Black | 270 | 0.46 | 0.33 | 0.87 | 0.84 |
| 7 | Black | 180 | 0.03 | 0.36 | 2.59 | 0.86 |
| 8 | Gray | 260 | 0.04 | 0.37 | 4.36 | 0.88 |
| 9 | Black | 220 | 0.03 | 0.33 | 8.96 | 0.88 |
| 10 | Gray | 150 | 0.05 | 0.36 | 14.22 | 0.81 |
| 11 | Black | 135 | 0.05 | 0.37 | 0.85 | 2.50 |
| 12 | Black | 120 | 0.07 | 0.34 | 0.83 | 4.27 |
| 13 | Black | 110 | 0.03 | 0.36 | 0.93 | 8.59 |
| 14 | Dark Gray | 100 | 0.05 | 0.36 | 0.88 | 13.72 |
| '15 | Gray | 210 | 0.10 | 0.35 | 2.57 | 2.31 |
| 16 | Brown | 140 | 0.11 | 0.37 | 6.60 | 2.48 |
| 17 | Black | 155 | 0.12 | 0.34 | 2.36 | 6.38 |
| 18 | Black | 180 | 0.06 | 0.31 | 4.13 | 8.65 |
| 19 | Black | 210 | 0.28 | 0.37 | 0.95 | 8.30 |
| 20 | Black | 205 | 0.05 | 0.35 | 8.46 | 4.95 |
| 21 | Black | 150 | 0.02 | 0.34 | 0.39 | 0.46 |
| 22 | Black | 185 | 0.05 | 0.34 | 0.43 | 0.44 |
| 23 | Black | .160 | 0.01 | 0.33 | 0.85 | 0.45 |
| 24 | Black | 110 | 0.02 | 0.38 | 0.41 | 0.79 |
| 25 | Black | 150 | 0.04 | 0.008 | 0.79 | 0.78 |
| 26 | Black | 155 | 0.03 | 0.074 | 0.76 | 0.88 |
| 27 | Black | 140 | 0.05 | 0.69 | 0.79 | 0.83 |

TABLE 3

| Comparative Example | Amount of Carbon (wt. part) | Amount of Boron (wt. part) | Amount of Yttrium (wt. part) | Amount of Additive (wt. part) | Added Compound |
|---|---|---|---|---|---|
| 28 | 0.00 | 0.50 | 1.00 | 1.00 | TiO$_2$ |
| 29 | 1.00 | 0.50 | 0.00 | 1.00 | TiO$_2$ |
| 30 | 1.00 | 0.50 | 1.00 | 0.00 | ZrO$_2$ |
| 31 | 6.00 | 0.50 | 1.00 | 1.00 | V$_2$O$_5$ |
| 32 | 1.00 | 0.50 | 20.00 | 1.00 | MoO$_3$ |
| 33 | 1.00 | 0.50 | 1.00 | 20.00 | WO$_3$ |
| 34 | 1.00 | 1.50 | 1.00 | 1.00 | WO$_3$ |

TABLE 4

| Comparative Example | Color Tone | Thermal Conductivity W/m·K | Carbon Content (wt. part) | Boron Content (wt. part) | Yttrium Content (wt. part) | Additive Content (wt. part) |
|---|---|---|---|---|---|---|
| 28 | Black | 65 | 0.00 | 0.35 | 0.85 | 0.79 |
| 29 | White | 50 | 0.02 | 0.37 | 0.00 | 0.78 |
| 30 | Pale Gray | 165 | 0.05 | 0.37 | 0.84 | 0.00 |
| 31 | Whitened | Not Densified | 0.61 | 0.37 | 0.86 | 0.76 |
| 32 | Spotted | 130 | 0.05 | 0.32 | 17.95 | 0.80 |
| 33 | Whitened | Not Densified | 0.05 | 0.33 | 0.92 | 17.67 |
| 34 | Whitened | Not Densified | 0.04 | 1.16 | 0.81 | 0.88 |

TABLE 5

| Example | Added Compound (for liberating carbon) | Amount of Yttrium (wt. part) | Amount of Boron (wt. part) | Amount of Additive (wt. part) | Added Compound |
|---|---|---|---|---|---|
| 35 | Glucose | 1.00 | 0.50 | 1.00 | $TiO_2$ |
| 36 | Fructose | 1.00 | 0.50 | 1.00 | $ZrO_2$ |
| 37 | Sucrose | 0.01 | 0.50 | 1.00 | $WO_3$ |
| 38 | Polethylene Terephthalate | 1.00 | 0.50 | 0.01 | $WO_3$ |
| 39 | Polyacrylonitrile | 1.00 | 0.50 | 1.00 | $MoO_3$ |
| 40 | Polyethylene Terephthalate | 1.00 | 0.50 | 1.00 | $CrO_3$ |
| 41 | Polyethylene Terephthalate | 3.00 | 0.50 | 1.00 | $Ta_2O_5$ |
| 42 | Glucose | 5.00 | 0.50 | 1.00 | $Nb_2O_5$ |
| 43 | Polyvinyl Butyral | 10.00 | 0.50 | 1.00 | $V_2O_5$ |
| 44 | Sucrose | 15.00 | 0.50 | 1.00 | $HfO_2$ |
| 45 | Fructose | 1.00 | 0.50 | 3.00 | $ZrO_2$ |
| 46 | Sucrose | 1.00 | 0.50 | 5.00 | $TiO_2$ |
| 47 | Polyethylene Terephthalate | 1.00 | 0.50 | 10.00 | TiN |
| 48 | Polyvinyl Butyral | 1.00 | 0.50 | 15.00 | TiC |
| 49 | Glucose | 3.00 | 0.50 | 3.00 | WC |
| 50 | Polyvinyl Alcohol | 7.50 | 0.50 | 3.00 | WC |
| 51 | Polyacrylonitrile | 3.00 | 0.50 | 7.50 | $W_2C$ |
| 52 | Polyvinyl Butyral | 5.00 | 0.50 | 10.00 | $WO_3$ |
| 53 | Sucrose | 1.00 | 0.50 | 10.00 | $WO_3$ |
| 54 | Fructose | 10.00 | 0.50 | 5.00 | $WO_3$ |
| 55 | Polyacrylonitrile | 0.50 | 0.50 | 0.50 | $TiO_2$ |
| 56 | Polyvinyl Butyral | 0.50 | 0.50 | 0.50 | $TiO_2$ |
| 57 | Sucrose | 1.00 | 0.50 | 0.50 | $ZrO_2$ |
| 58 | Polyvinyl Alcohol | 0.50 | 0.50 | 1.00 | $ZrO_2$ |

TABLE 6

| Example | Heat Treatment Temperature (°C.) | Heat Treatment Time (h.) | Carbon Content (wt. part) |
|---|---|---|---|
| 35 | 1000 | 2 | 0.86 |
| 36 | 300 | 5 | 0.01 |
| 37 | 1200 | 5 | 0.53 |
| 38 | 300 | 5 | 1.15 |
| 39 | 500 | 5 | 2.66 |
| 40 | 1500 | 2 | 4.57 |
| 41 | 300 | 5 | 1.23 |
| 42 | 1200 | 10 | 0.84 |
| 43 | 1200 | 2 | 1.19 |
| 44 | 1200 | 10 | 0.83 |
| 45 | 1500 | 2 | 1.27 |
| 46 | 1000 | 5 | 0.99 |
| 47 | 800 | 2 | 1.05 |
| 48 | 500 | 5 | 1.34 |
| 49 | 800 | 10 | 3.08 |
| 50 | 500 | 10 | 3.38 |
| 51 | 1200 | 2 | 3.36 |
| 52 | 500 | 5 | 0.97 |
| 53 | 150 | 10 | 4.39 |
| 54 | 1200 | 5 | 0.96 |
| 55 | 800 | 2 | 0.52 |
| 56 | 1200 | 5 | 1.13 |
| 57 | 150 | 5 | 0.39 |
| 58 | 1500 | 2 | 0.41 |

TABLE 7

| Example | Color Tone | Thermal Conductivity W/m K | Carbon Content (wt. part) | Boron Content (wt. part) | Yttrium Content (wt. part) | Additive Content (wt. part) |
|---|---|---|---|---|---|---|
| 35 | Black | 160 | 0.03 | 0.43 | 0.87 | 0.86 |
| 36 | Black | 110 | 0.002 | 0.45 | 0.86 | 0.87 |
| 37 | Black | 105 | 0.02 | 0.41 | 0.01 | 0.83 |
| 38 | Dark Gray | 175 | 0.08 | 0.44 | 0.76 | 0.01 |
| 39 | Black | 215 | 0.11 | 0.39 | 0.88 | 0.83 |
| 40 | Black | 260 | 0.38 | 0.43 | 0.79 | 0.84 |
| 41 | Black | 180 | 0.03 | 0.40 | 2.49 | 0.83 |
| 42 | Gray | 260 | 0.03 | 0.37 | 4.66 | 0.87 |
| 43 | Black | 245 | 0.02 | 0.39 | 8.75 | 0.84 |
| 44 | Black | 145 | 0.04 | 0.45 | 13.05 | 0.83 |
| 45 | Black | 130 | 0.01 | 0.46 | 0.94 | 2.62 |
| 46 | Black | 125 | 0.03 | 0.38 | 0.87 | 3.94 |
| 47 | Dark Gray | 120 | 0.02 | 0.42 | 0.82 | 8.75 |
| 48 | Black | 100 | 0.03 | 0.47 | 0.84 | 12.42 |
| 49 | Black | 210 | 0.10 | 0.41 | 2.58 | 2.38 |
| 50 | Black | 170 | 0.12 | 0.44 | 6.96 | 2.34 |
| 51 | Black | 150 | 0.12 | 0.40 | 2.31 | 6.80 |
| 52 | Black | 180 | 0.02 | 0.46 | 4.30 | 8.67 |
| 53 | Black | 205 | 0.35 | 0.45 | 0.88 | 8.82 |
| 54 | Black | 200 | 0.04 | 0.43 | 8.63 | 4.12 |
| 55 | Black | 130 | 0.03 | 0.44 | 0.41 | 0.40 |
| 56 | Black | 175 | 0.02 | 0.38 | 0.43 | 0.38 |
| 57 | Black | 165 | 0.01 | 0.39 | 0.80 | 0.37 |
| 58 | Black | 120 | 0.02 | 0.43 | 0.43 | 0.91 |

TABLE 8

| Example | Amount of Boron (wt. part) | Amount of Yttrium (wt. part) | Amount of Additive (wt. part) | Added Compound |
|---|---|---|---|---|
| 59 | 0.50 | 1.00 | 1.00 | $TiO_2$ |
| 60 | 0.50 | 1.00 | 1.00 | $TiO_2$ |
| 61 | 0.50 | 0.01 | 1.00 | $TiO_2$ |
| 62 | 0.50 | 1.00 | 0.01 | $TiO_2$ |
| 63 | 0.50 | 1.00 | 1.00 | $ZrO_2$ |
| 64 | 0.50 | 1.00 | 1.00 | $HfO_2$ |
| 65 | 0.50 | 3.00 | 1.00 | $V_2O_5$ |
| 66 | 0.50 | 5.00 | 1.00 | $V_2O_3$ |
| 67 | 0.50 | 10.00 | 1.00 | $Nb_2O_5$ |
| 68 | 0.50 | 15.00 | 1.00 | $Ta_2O_5$ |
| 69 | 0.50 | 1.00 | 3.00 | $CrO_3$ |
| 70 | 0.50 | 1.00 | 5.00 | $MoO_3$ |
| 71 | 0.50 | 1.00 | 10.00 | $WO_3$ |
| 72 | 0.50 | 1.00 | 15.00 | $WO_3$ |
| 73 | 0.50 | 3.00 | 3.00 | $MoO_3$ |
| 74 | 0.50 | 7.50 | 3.00 | $MoO_3$ |
| 75 | 0.50 | 3.00 | 7.50 | $MoO_3$ |
| 76 | 0.50 | 5.00 | 10.00 | $ZrO_2$ |
| 77 | 0.50 | 1.00 | 10.00 | $ZrO_2$ |
| 78 | 0.50 | 10.00 | 5.00 | $ZrO_2$ |
| 79 | 0.50 | 0.50 | 0.50 | TiN |
| 80 | 0.50 | 0.50 | 0.50 | TiN |
| 81 | 0.50 | 1.00 | 0.50 | TiN |
| 82 | 0.50 | 0.50 | 1.00 | TiN |
| 83 | 0.01 | 1.00 | 1.00 | $WO_3$ |
| 84 | 0.10 | 1.00 | 1.00 | $WO_3$ |

TABLE 8-continued

| Example | Amount of Boron (wt. part) | Amount of Yttrium (wt. part) | Amount of Additive (wt. part) | Added Compound |
|---|---|---|---|---|
| 85 | 1.00 | 1.00 | 1.00 | WO₃ |

TABLE 9

| Example | Amount of Hydrocarbon Gas (vol. %) | Type of Hydrocarbon Gas | Amount of Nitrogen Gas (vol. %) | Rest Gas |
|---|---|---|---|---|
| 59 | 30.0 | Butane Gas | 10.0 | Ammonia Gas |
| 60 | 20.0 | Propane Gas | 80.0 | — |
| 61 | 25.0 | Propane Gas | 75.0 | — |
| 62 | 30.0 | Propane Gas | 70.0 | — |
| 63 | 60.0 | Propane Gas | 20.0 | Argon Gas |
| 64 | 90.0 | Propane Gas | 10.0 | — |
| 65 | 30.0 | Ethylene Gas | 20.0 | Argon Gas |
| 66 | 30.0 | Ethylene Gas | 70.0 | — |
| 67 | 30.0 | Ethylene Gas | 70.0 | — |
| 68 | 30.0 | Ethylene Gas | 30.0 | Ammonia Gas |
| 69 | 30.0 | Acetylene Gas | 70.0 | — |
| 70 | 30.0 | Acetylene Gas | 70.0 | — |
| 71 | 30.0 | Acetylene Gas | 70.0 | — |
| 72 | 30.0 | Acetylene Gas | 70.0 | — |
| 73 | 50.0 | Methane Gas | 50.0 | — |
| 74 | 50.0 | Methane Gas | 50.0 | — |
| 75 | 50.0 | Methane Gas | 50.0 | — |
| 76 | 30.0 | Butane Gas | 30.0 | Ammonia Gas |
| 77 | 90.0 | Butane Gas | 10.0 | — |
| 78 | 30.0 | Butane Gas | 70.0 | — |
| 79 | 20.0 | Methane Gas | 50.0 | Ammonia Gas |
| 80 | 30.0 | Methane Gas | 30.0 | Ammonia Gas |
| 81 | 20.0 | Methane Gas | 70.0 | — |
| 82 | 20.0 | Methane Gas | 80.0 | — |
| 83 | 30.0 | Propane Gas | 70.0 | — |
| 84 | 30.0 | Propane Gas | 70.0 | — |
| 85 | 30.0 | Propane Gas | 70.0 | — |

TABLE 10

| Example | Color Tone | Thermal Conductivity W/m K | Carbon Content (wt. part) | Boron Content (wt. part) | Yttrium Content (wt. part) | Additive Content (wt. part) |
|---|---|---|---|---|---|---|
| 59 | Black | 155 | 0.02 | 0.36 | 0.83 | 0.87 |
| 60 | Black | 125 | 0.01 | 0.35 | 0.92 | 0.81 |
| 61 | Black | 140 | 0.03 | 0.35 | 0.01 | 0.77 |
| 62 | Gray | 175 | 0.02 | 0.37 | 0.88 | 0.01 |
| 63 | Black | 210 | 0.12 | 0.34 | 0.78 | 0.78 |
| 64 | Black | 240 | 0.20 | 0.32 | 0.84 | 0.83 |
| 65 | Black | 170 | 0.03 | 0.37 | 2.61 | 0.80 |
| 66 | Gray | 185 | 0.04 | 0.35 | 4.04 | 0.84 |
| 67 | Black | 210 | 0.04 | 0.35 | 8.35 | 0.85 |
| 68 | Dark Gray | 180 | 0.05 | 0.36 | 13.79 | 0.82 |
| 69 | Black | 160 | 0.02 | 0.34 | 0.85 | 2.46 |
| 70 | Black | 145 | 0.03 | 0.34 | 0.79 | 4.23 |
| 71 | Black | 130 | 0.03 | 0.33 | 0.76 | 8.66 |
| 72 | Black | 115 | 0.04 | 0.35 | 0.79 | 13.74 |
| 73 | Black | 200 | 0.08 | 0.35 | 2.48 | 2.38 |
| 74 | Black | 210 | 0.09 | 0.37 | 7.37 | 2.39 |
| 75 | Black | 175 | 0.07 | 0.36 | 2.47 | 6.51 |
| 76 | Black | 170 | 0.04 | 0.34 | 4.10 | 9.00 |
| 77 | Black | 185 | 0.23 | 0.35 | 0.82 | 8.70 |
| 78 | Black | 190 | 0.04 | 0.35 | 8.54 | 4.17 |
| 79 | Dark Gray | 140 | 0.01 | 0.38 | 0.38 | 0.36 |
| 80 | Black | 150 | 0.04 | 0.36 | 0.38 | 0.41 |
| 81 | Black | 140 | 0.02 | 0.35 | 0.86 | 0.40 |
| 82 | Black | 110 | 0.01 | 0.37 | 0.39 | 0.85 |
| 83 | Black | 150 | 0.04 | 0.007 | 0.81 | 0.78 |
| 84 | Black | 140 | 0.03 | 0.078 | 0.83 | 0.80 |
| 85 | Black | 125 | 0.04 | 0.70 | 0.85 | 0.85 |

TABLE 11

| Example | Amount of Carbon (wt. part) | Amount of Boron (wt. part) | Amount of Rare Earth Element (wt. part) | Amount of TiO₂ (in Terms of Ti) (wt. part) | Added Rare Earth Element Compound |
|---|---|---|---|---|---|
| 86 | 1.00 | 0.50 | 1.00 | 1.00 | Sc₂O₃ |
| 87 | 1.00 | 0.50 | 1.00 | 1.00 | Y₂O₃ |
| 88 | 1.00 | 0.50 | 1.00 | 1.00 | La₂O₃ |
| 89 | 1.00 | 0.50 | 1.00 | 1.00 | Ce₂O₃ |
| 90 | 3.00 | 0.50 | 3.00 | 1.00 | Sc₂O₃ |
| 91 | 3.00 | 0.50 | 3.00 | 3.00 | Y₂O₃ |
| 92 | 3.00 | 0.50 | 3.00 | 3.00 | La₂O₃ |
| 93 | 3.00 | 0.50 | 0.50 | 0.50 | Ce₂O₃ |
| 94 | 0.50 | 0.50 | 0.50 | 0.50 | Sc₂O₃ |
| 95 | 0.50 | 0.50 | 0.50 | 0.50 | Y₂O₃ |
| 96 | 0.50 | 0.50 | 0.50 | 0.50 | La₂O₃ |
| 97 | 0.50 | 0.50 | 0.50 | 0.50 | Ce₂O₃ |

TABLE 12

| Example | Color Tone | Thermal Conductivity W/m·K | Carbon Content (wt. part) | Boron Content (wt. part) | Rare Earth Element Content (wt. part) | Ti Content (wt. part) |
|---|---|---|---|---|---|---|
| 86 | Black | 130 | 0.03 | 0.38 | 0.83 | 0.82 |
| 87 | Black | 155 | 0.03 | 0.36 | 0.89 | 0.83 |
| 88 | Black | 125 | 0.03 | 0.39 | 0.84 | 0.86 |
| 89 | Black | 130 | 0.03 | 0.44 | 0.81 | 0.85 |
| 90 | Black | 180 | 0.11 | 0.39 | 2.51 | 2.52 |
| 91 | Black | 205 | 0.11 | 0.37 | 2.66 | 2.63 |
| 92 | Black | 190 | 0.10 | 0.42 | 2.64 | 2.51 |
| 93 | Dark Gray | 210 | 0.12 | 0.42 | 2.56 | 2.46 |
| 94 | Dark Gray | 105 | 0.01 | 0.43 | 0.37 | 0.40 |
| 95 | Black | 140 | 0.02 | 0.39 | 0.39 | 0.40 |
| 96 | Black | 130 | 0.01 | 0.40 | 0.40 | 0.39 |
| 97 | Black | 130 | 0.01 | 0.43 | 0.39 | 0.41 |

TABLE 13

| Example | Amount of Carbon (wt. part) | Amount of Boron (wt. part) | Amount of Rare Earth Element (wt. part) | Amount of WO₃ (in Terms of W) (wt. part) | Added Rare Earth Element Compound |
|---|---|---|---|---|---|
| 98 | 1.00 | 0.50 | 1.00 | 1.00 | Sc₂O₃ |
| 99 | 1.00 | 0.50 | 1.00 | 1.00 | Y₂O₃ |
| 100 | 1.00 | 0.50 | 1.00 | 1.00 | La₂O₃ |
| 101 | 1.00 | 0.50 | 1.00 | 1.00 | Ce₂O₃ |
| 102 | 3.00 | 0.50 | 3.00 | 3.00 | Sc₂O₃ |
| 103 | 3.00 | 0.50 | 3.00 | 3.00 | Y₂O₃ |
| 104 | 3.00 | 0.50 | 3.00 | 3.00 | La₂O₃ |
| 105 | 3.00 | 0.50 | 3.00 | 3.00 | Ce₂O₃ |
| 106 | 0.50 | 0.50 | 0.50 | 0.50 | Sc₂O₃ |
| 107 | 0.50 | 0.50 | 0.50 | 0.50 | Y₂O₃ |
| 108 | 0.50 | 0.50 | 0.50 | 0.50 | La₂O₃ |
| 109 | 0.50 | 0.50 | 0.50 | 0.50 | Ce₂O₃ |

TABLE 14

| Example | Color Tone | Thermal Conductivity W/m·K | Carbon Content (wt. part) | Boron Content (wt. part) | Rare Earth Element Content (wt. part) | W Content (wt. part) |
| --- | --- | --- | --- | --- | --- | --- |
| 98 | Black | 140 | 0.02 | 0.91 | 0.87 | 0.85 |
| 99 | Black | 160 | 0.03 | 0.89 | 0.83 | 0.90 |
| 100 | Black | 155 | 0.03 | 0.88 | 0.80 | 0.83 |
| 101 | Black | 140 | 0.02 | 0.90 | 0.86 | 0.81 |
| 102 | Black | 195 | 0.11 | 2.70 | 2.67 | 2.60 |
| 103 | Black | 200 | 0.10 | 2.75 | 2.46 | 2.69 |
| 104 | Black | 185 | 0.10 | 2.68 | 2.41 | 2.45 |
| 105 | Black | 205 | 0.12 | 2.78 | 2.58 | 2.55 |
| 106 | Black | 130 | 0.01 | 0.39 | 0.39 | 0.39 |
| 107 | Black | 150 | 0.02 | 0.34 | 0.39 | 0.46 |
| 108 | Black | 130 | 0.01 | 0.37 | 0.38 | 0.36 |
| 109 | Black | 135 | 0.02 | 0.38 | 0.37 | 0.38 |

TABLE 15

| Comparative Example | Amount of Carbon (wt. part) | Amount of Boron (wt. part) | Amount of Rare Earth Element (wt. part) | Amount of WO$_3$ (in Terms of W) (wt. part) | Added Rare Earth Element |
| --- | --- | --- | --- | --- | --- |
| 110 | 0.00 | 0.50 | 1.00 | 1.00 | Sc$_2$O$_3$ |
| 111 | 0.00 | 0.50 | 1.00 | 1.00 | Y$_2$O$_3$ |
| 112 | 0.00 | 0.50 | 1.00 | 1.00 | La$_2$O$_3$ |
| 113 | 0.00 | 0.50 | 1.00 | 1.00 | Ce$_2$O$_3$ |
| 114 | 1.00 | 0.50 | 20.00 | 1.00 | Sc$_2$O$_3$ |
| 115 | 1.00 | 0.50 | 20.00 | 1.00 | Y$_2$O$_3$ |
| 116 | 1.00 | 0.50 | 20.00 | 1.00 | La$_2$O$_3$ |
| 117 | 1.00 | 0.50 | 20.00 | 1.00 | Ce$_2$O$_3$ |
| 118 | 1.00 | 0.50 | 1.00 | 0.00 | Sc$_2$O$_3$ |
| 119 | 1.00 | 0.50 | 1.00 | 0.00 | Y$_2$O$_3$ |
| 120 | 1.00 | 0.50 | 1.00 | 0.00 | La$_2$O$_3$ |
| 121 | 1.00 | 0.50 | 1.00 | 0.00 | Ce$_2$O$_3$ |
| 122 | 1.00 | 0.50 | 1.00 | 20.00 | Sc$_2$O$_3$ |
| 123 | 1.00 | 0.50 | 1.00 | 20.00 | Y$_2$O$_3$ |
| 124 | 1.00 | 0.50 | 1.00 | 20.00 | La$_2$O$_3$ |
| 125 | 1.00 | 0.50 | 1.00 | 20.00 | Ce$_2$O$_3$ |
| 126 | 1.00 | 1.50 | 1.00 | 1.00 | Sc$_2$O$_3$ |
| 127 | 1.00 | 1.50 | 1.00 | 1.00 | Y$_2$O$_3$ |
| 128 | 1.00 | 1.50 | 1.00 | 1.00 | La$_2$O$_3$ |
| 129 | 1.00 | 1.50 | 1.00 | 1.00 | Ce$_2$O$_3$ |

TABLE 16

| Comparative Example | Color Tone | Thermal Conductivity W/m·K | Carbon Content (wt. part) | Boron Content (wt. part) | Rare Earth Element Content (wt. part) | W Content (wt. part) |
| --- | --- | --- | --- | --- | --- | --- |
| 110 | Black | 60 | 0.001 | 0.35 | 0.81 | 0.85 |
| 111 | Black | 55 | 0.002 | 0.36 | 0.82 | 0.84 |
| 112 | Black | 50 | 0.002 | 0.36 | 0.86 | 0.90 |
| 113 | Black | 65 | 0.001 | 0.38 | 0.82 | 0.89 |
| 114 | Gray Spot | 120 | 0.03 | 0.37 | 16.56 | 0.86 |
| 115 | White Spot | 135 | 0.05 | 0.34 | 16.28 | 0.83 |
| 116 | Yellow Spot | 130 | 0.02 | 0.35 | 15.88 | 0.82 |
| 117 | White Spot | 110 | 0.03 | 0.35 | 16.40 | 0.86 |
| 118 | White | 155 | 0.03 | 0.33 | 0.90 | 0.00 |
| 119 | White | 180 | 0.03 | 0.36 | 0.88 | 0.00 |
| 120 | White | 160 | 0.02 | 0.37 | 0.82 | 0.00 |
| 121 | White | 165 | 0.04 | 0.35 | 0.91 | 0.00 |
| 122 | Whitened not densified | | 0.03 | 0.36 | 0.87 | 16.71 |
| 123 | Whitened not densified | | 0.05 | 0.33 | 0.92 | 17.67 |
| 124 | Whitened not densified | | 0.02 | 0.35 | 0.87 | 16.45 |
| 125 | Whitened not densified | | 0.04 | 0.33 | 0.86 | 16.63 |
| 126 | Whitened not densified | | 0.03 | 1.08 | 0.85 | 0.87 |
| 127 | Whitened not densified | | 0.04 | 1.16 | 0.81 | 0.88 |
| 128 | Whitened not densified | | 0.03 | 1.15 | 0.92 | 0.86 |
| 129 | Whitened not densified | | 0.04 | 1.02 | 0.87 | 0.85 |

According to the present invention, as hereinabove described, it is possible to obtain an aluminum nitride sintered body which is colored and simultaneously has an excellent thermal conductivity. The present aluminum sintered body is useful as an electronic material such as an IC package material or a substrate material.

What is claimed is:

1. A thermal conductive aluminum nitride sintered body, comprising: aluminum nitride 100 parts by weight, carbon within the range of at least 0.005 to not more than 0.5 parts by weight of carbon, a boron compound within the range of 0.01 to 1.0 parts by weight in terms of the simple substance of boron, a rare earth aluminum oxide within the range of 0.01 to 15 parts by weight of said rare earth aluminum oxide in terms of the simple substance of a rare earth element, and at least one compound selected from the group consisting of compounds containing elements belonging to groups IVB, VB and VIB of the periodic table, said compound being present within the range of 0.01 to 15 parts by weight in terms of the simple substance of the element contained in said compound, said thermal conductive aluminum nitride sintered body having a thermal conductivity of at least 100 W/m·K and not more than 270 W/m·K at room temperature, said sintered body having a color within the range of gray to black.

2. The thermal conductive aluminum nitride sintered body in accordance with claim 1, wherein said rare earth element is selected from the group consisting of scandium, yttrium, lanthanum and cerium.

3. The thermal conductive aluminum nitride sintered body in accordance with claim 1, wherein said body comprises aluminum nitride crystal grains having a mean particle diameter within the range of 2 to 15 μm on a fracture of said aluminum nitride sintered body, and wherein a ratio of said mean particle diameter to a mean particle diameter of particles of said compound of said element belonging to said groups IVB, VB or VIB of the periodic table, is at least 2.0.

4. A method of producing a thermal conductive aluminum nitride sintered body having a color within the range from gray to black and a thermal conductivity within the range of 100 to 270 W/m·K at room temperature, said method comprising the following steps:

mixing 100 parts by weight of aluminum nitride with the following components, at least 0.01 parts by weight and not more than 5 parts by weight of carbon, boron oxide within the range of 0.01 to 1.0 parts by weight of boron oxide in terms of the simple substance of boron, at least 0.01 parts by weight and not more than 15 parts by weight of an oxide of a rare earth element in terms of the simple substance of said rare earth element, and at least 0.01 parts by weight and not more than 15 parts by weight of at least one compound selected from the group consisting of oxides, carbides, and nitrides of elements belonging to the groups IVB, VB and VIB of the periodic table in terms of the simple substance of the element contained in said compound, to form a mixture; shaping said mixture into a prescribed configuration for obtaining a compact; and firing said compact in a non-oxidizing atmosphere containing at least 10 percent by volume of nitrogen at a temperature of at least 1500° C. and not more than 2100° C.

5. A method of producing a thermal conductive aluminum nitride sintered body having a color within the range from gray to black and a thermal conductivity within the range of 100 to 270 W/m·K at room temperature, said method comprising the following steps:

mixing 100 parts by weight of aluminum nitride with the following components, at least 0.01 parts by weight and not more than 5 parts by weight of a compound liberating carbon in terms of the amount of free carbon, 0.01 to 1.0 parts by weight of boron oxide in terms of the simple substance of boron, at least 0.01 parts by weight and not more than 15 parts by weight of an oxide of a rare earth element in terms of the simple substance of said rare earth element, and at least 0.01 parts by weight and not more than 15 parts by weight of at least one compound selected from the group consisting of oxides, carbides, and nitrides of elements belonging to the groups IVB, VB and VIB of the periodic table in terms of the simple substance of the element contained in said compound, to form a mixture;

shaping said mixture into a prescribed configuration for obtaining a compact; heating said compact in a non-oxidizing atmosphere at a temperature of at least 150° C. and not more than 1500° C. for liberating carbon; and firing said compact in a non-oxidizing atmosphere containing at least 10 percent by volume of nitrogen at a temperature of at least 1500° C. and not more than 2100° C.

6. The method of claim 5, wherein said compound liberating carbon is at least one compound selected from the group consisting of polyacrylonitrile, polyvinyl alcohol, polyvinyl butyral, polyethylene terephthalate, glucose, fructose and sucrose.

7. A method of producing a thermal conductive aluminum nitride sintered body having a color within the range from gray to black and a thermal conductivity within the range of 100 to 270 W/m·K at room temperature, said method comprising the following steps:

mixing 100 parts by weight of aluminum nitride with the following components, 0.01 to 1.0 parts by weight of boron oxide in terms of the simple substance of boron, at least 0.01 parts by weight and not more than 15 parts by weight of an oxide of a rare earth element in terms of said rare earth element, and at least 0.01 parts by weight and not more than 15 parts by weight of at least one compound selected from the group consisting of oxides, carbides, and nitrides of elements belonging to the groups IVB, VB and VIB of the periodic table in terms of the simple substance of the element contained in said compound, to form a mixture;

shaping said mixture into a prescribed configuration for obtaining a compact; and firing said compact in a non-oxidizing atmosphere containing at least 10 percent by volume and not more than 90 percent by volume of hydrocarbon gas and at least 10 percent by volume of nitrogen at a temperature of at least 1500° C. and not more than 2100° C.

8. The method of claim 7, wherein said hydrocarbon gas is any member of the group consisting of methane gas, ethylene gas, acetylene gas, propane gas, and butane gas.

* * * * *